United States Patent
Fritz et al.

(10) Patent No.: US 10,400,724 B2
(45) Date of Patent: Sep. 3, 2019

(54) ASSEMBLY CONSISTING OF A CYLINDER HEAD AND A FUEL INJECTOR

(71) Applicant: GE Jenbacher GmbH & Co OG, Jenbach (AT)

(72) Inventors: Jassin Marcel Fritz, Munich (DE); Dino Imhof, Baden (CH); Raphael Jacob, Pfaffenhofen (DE); Georg Tinschmann, Schwaz (AT)

(73) Assignee: GE Global Sourcing LLC, Norwalk, CT (US)

( * ) Notice: Subject to any disclaimer, the term of this patent is extended or adjusted under 35 U.S.C. 154(b) by 0 days.

(21) Appl. No.: 15/564,433

(22) PCT Filed: Apr. 8, 2016

(86) PCT No.: PCT/AT2016/000035
§ 371 (c)(1),
(2) Date: Oct. 5, 2017

(87) PCT Pub. No.: WO2016/164943
PCT Pub. Date: Oct. 20, 2016

(65) Prior Publication Data
US 2018/0142654 A1    May 24, 2018

(30) Foreign Application Priority Data
Apr. 14, 2015  (AT) ..................... 225/2015

(51) Int. Cl.
*F02M 53/04*    (2006.01)
*F02M 53/08*    (2006.01)
(Continued)

(52) U.S. Cl.
CPC ............. *F02M 53/046* (2013.01); *F01P 3/16* (2013.01); *F02B 23/10* (2013.01);
(Continued)

(58) Field of Classification Search
CPC .... F02M 53/046; F02M 53/043; F02M 53/08; F02M 31/20; F02M 61/14; F02M 2700/077; F01P 3/16
(Continued)

(56) References Cited

U.S. PATENT DOCUMENTS 1,805,358 A    5/1931  Burn
1,879,985 A *  9/1932  Lummen .............. F02M 53/043
                                              239/132.3
(Continued)

FOREIGN PATENT DOCUMENTS

AT    516620 B1    7/2016
DE    585 056 C    9/1933
(Continued)

OTHER PUBLICATIONS

First Office Action and Search issued in connection with corresponding AT Application No. A 225/2015 dated Aug. 19, 2015.
(Continued)

*Primary Examiner* — Mahmoud Gimie
(74) *Attorney, Agent, or Firm* — McCoy Russell LLP

(57) ABSTRACT

An assembly of a cylinder head and a fuel injector with an injector tip for an internal combustion engine with at least one combustion chamber, wherein the fuel injector at the end facing a combustion chamber of the internal combustion engine is at least partially surrounded by a heat shield, wherein in the region of the heat shield a heat dissipation device is provided, through which heat can be dissipated from the combustion chamber of the internal combustion engine, wherein the heat shield surrounds the fuel injector as far as the injector tip, wherein the heat shield is designed as a tapering collar towards the injector tip and is integrated into an injector sleeve or into the cylinder head.

11 Claims, 7 Drawing Sheets

(51) Int. Cl.
    *F01P 3/16*      (2006.01)
    *F02M 31/20*     (2006.01)
    *F02M 61/14*     (2006.01)
    *F02B 23/10*     (2006.01)
    *F02M 21/02*     (2006.01)
    *F02B 75/12*     (2006.01)

(52) U.S. Cl.
    CPC ........ *F02M 21/0275* (2013.01); *F02M 31/20* (2013.01); *F02M 53/043* (2013.01); *F02M 53/08* (2013.01); *F02M 61/14* (2013.01); *F02B 2075/125* (2013.01); *F02M 2700/077* (2013.01); *Y02T 10/123* (2013.01); *Y02T 10/125* (2013.01); *Y02T 10/32* (2013.01)

(58) Field of Classification Search
    USPC ........................................ 123/294, 540, 541
    See application file for complete search history.

(56) References Cited

U.S. PATENT DOCUMENTS

| | | | |
|---|---|---|---|
| 2,322,606 A | 6/1943 | Ward | |
| 8,434,457 B2 | 5/2013 | Coldren et al. | |
| 8,480,009 B2 | 7/2013 | Hanson et al. | |
| 2015/0034051 A1* | 2/2015 | Werger | F02M 53/04 123/470 |

FOREIGN PATENT DOCUMENTS

| | | | |
|---|---|---|---|
| DE | 1 526 709 A1 | 3/1970 | |
| DE | 35 29 769 A1 | 2/1987 | |
| DE | 102 34 324 A1 | 2/2004 | |
| EP | 0 961 024 A1 | 12/1999 | |
| GB | 273211 A | 6/1927 | |
| GB | 299635 A * | 11/1928 | ............... F01P 3/16 |
| GB | 446274 A | 4/1936 | |
| GB | 717685 A * | 11/1954 | ............ F02M 53/08 |
| GB | 755316 A | 8/1956 | |
| GB | 762792 A * | 12/1956 | ............... F01P 3/16 |
| GB | 2504517 A | 2/2014 | |
| WO | 2013/029760 A1 | 3/2013 | |

OTHER PUBLICATIONS

Second Office Action issued in connection with corresponding AT Application No. A 225/2015 dated Mar. 18, 2016.

\* cited by examiner

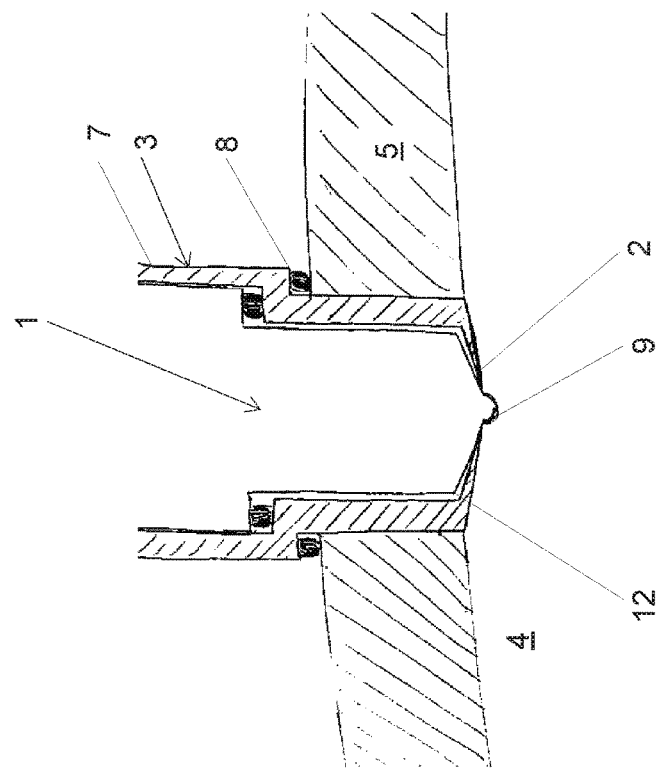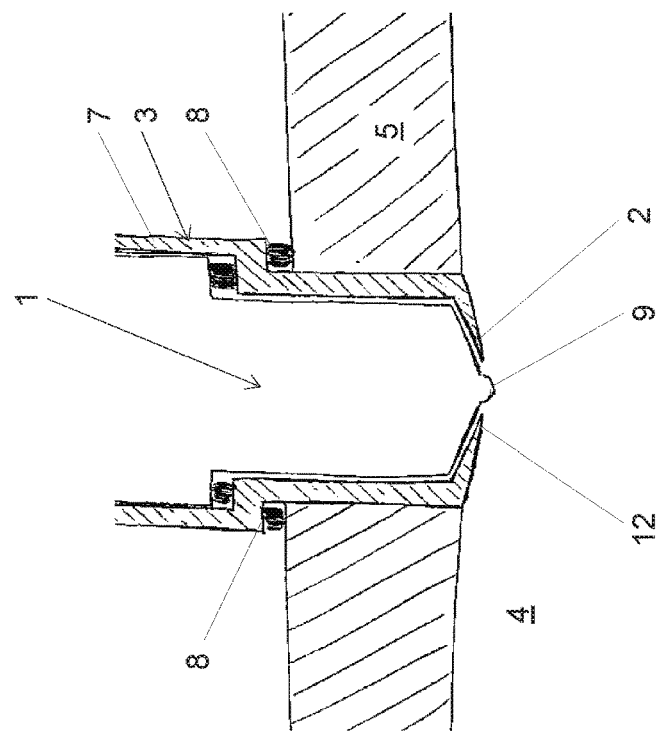

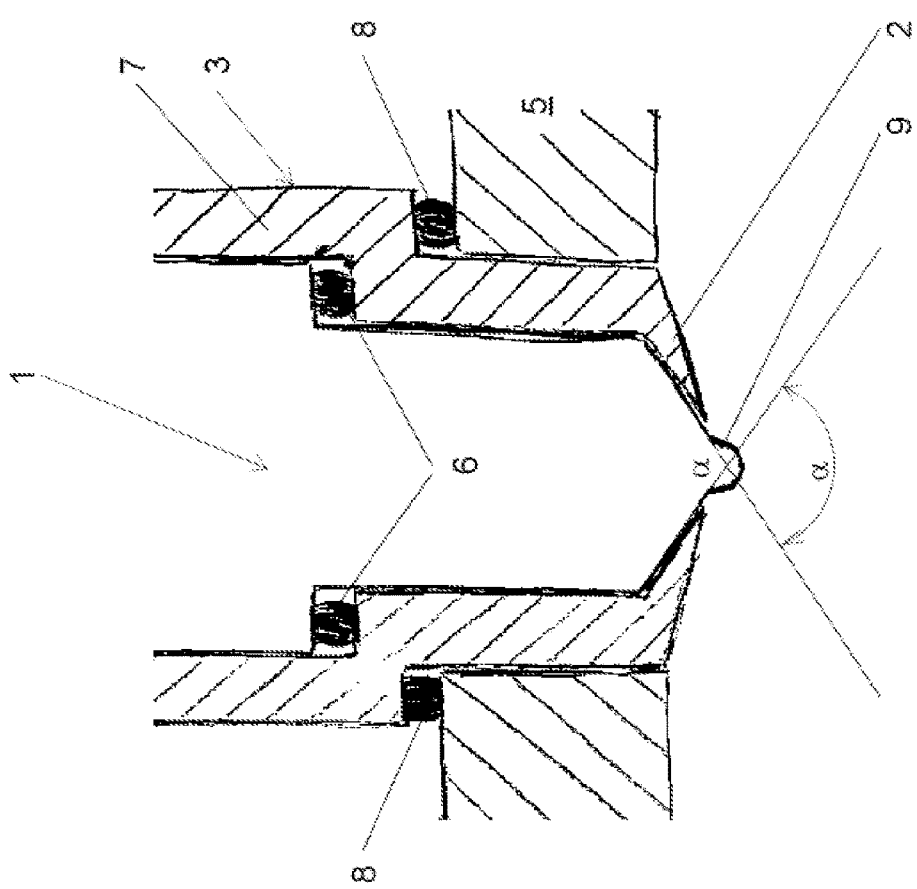

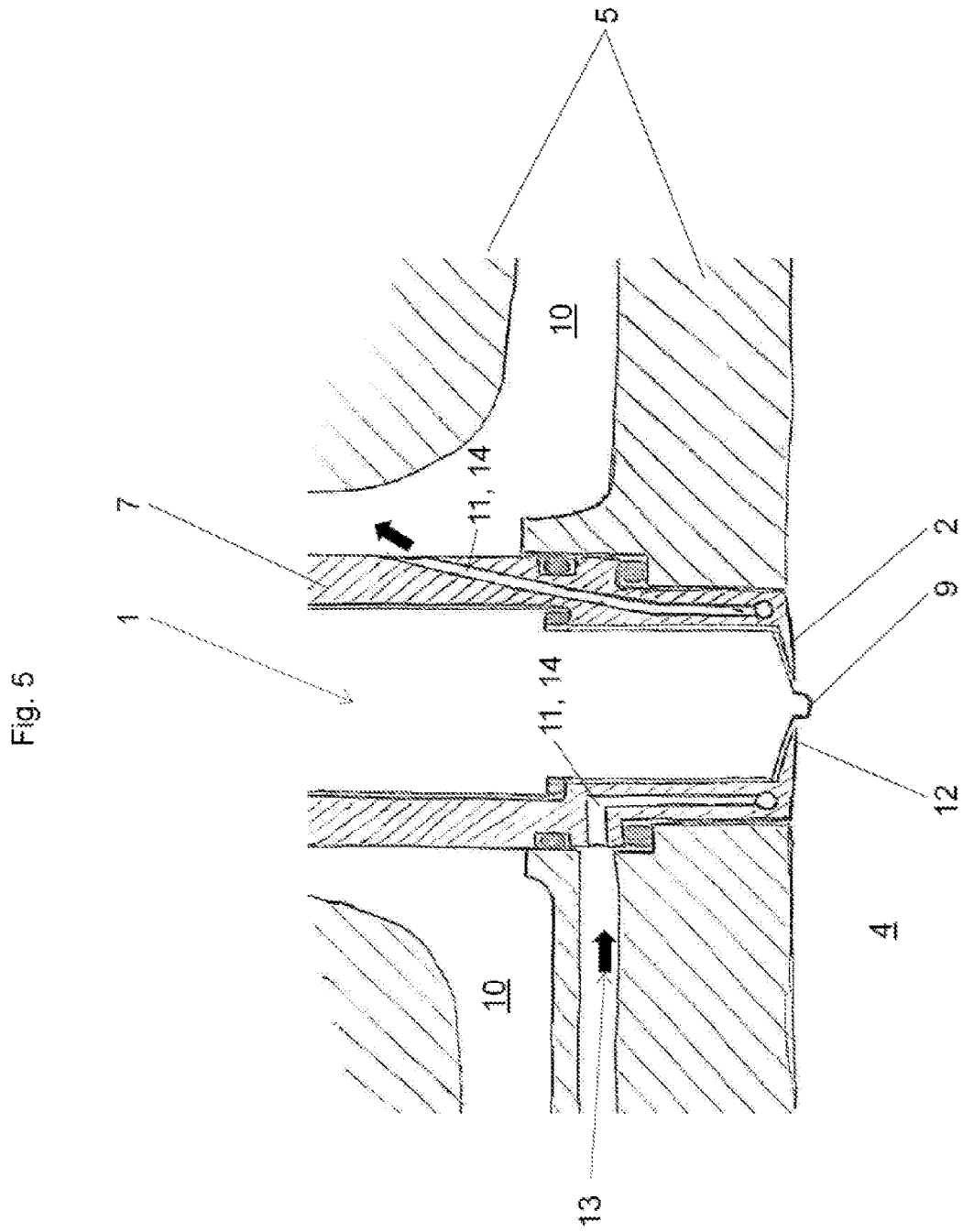

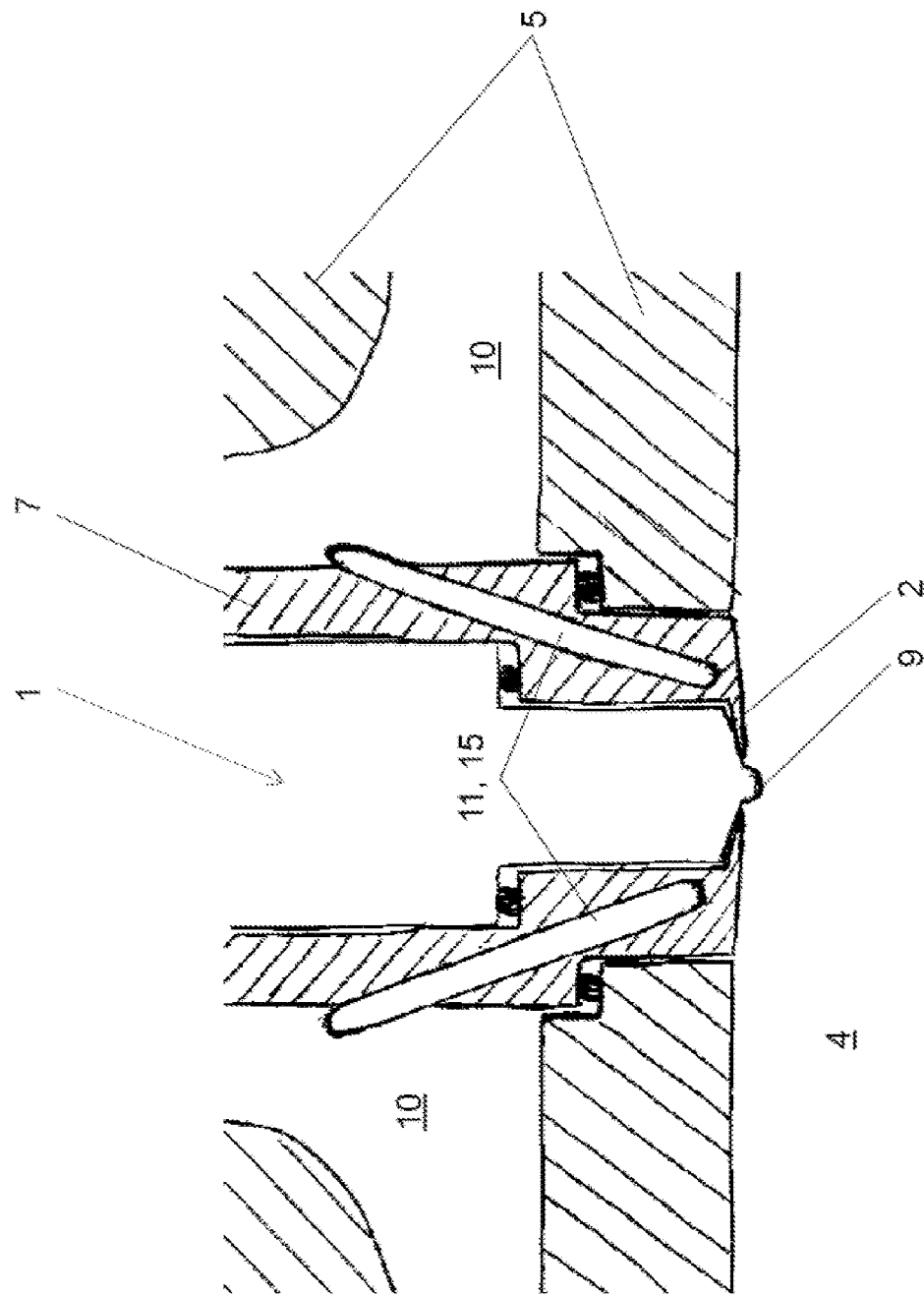

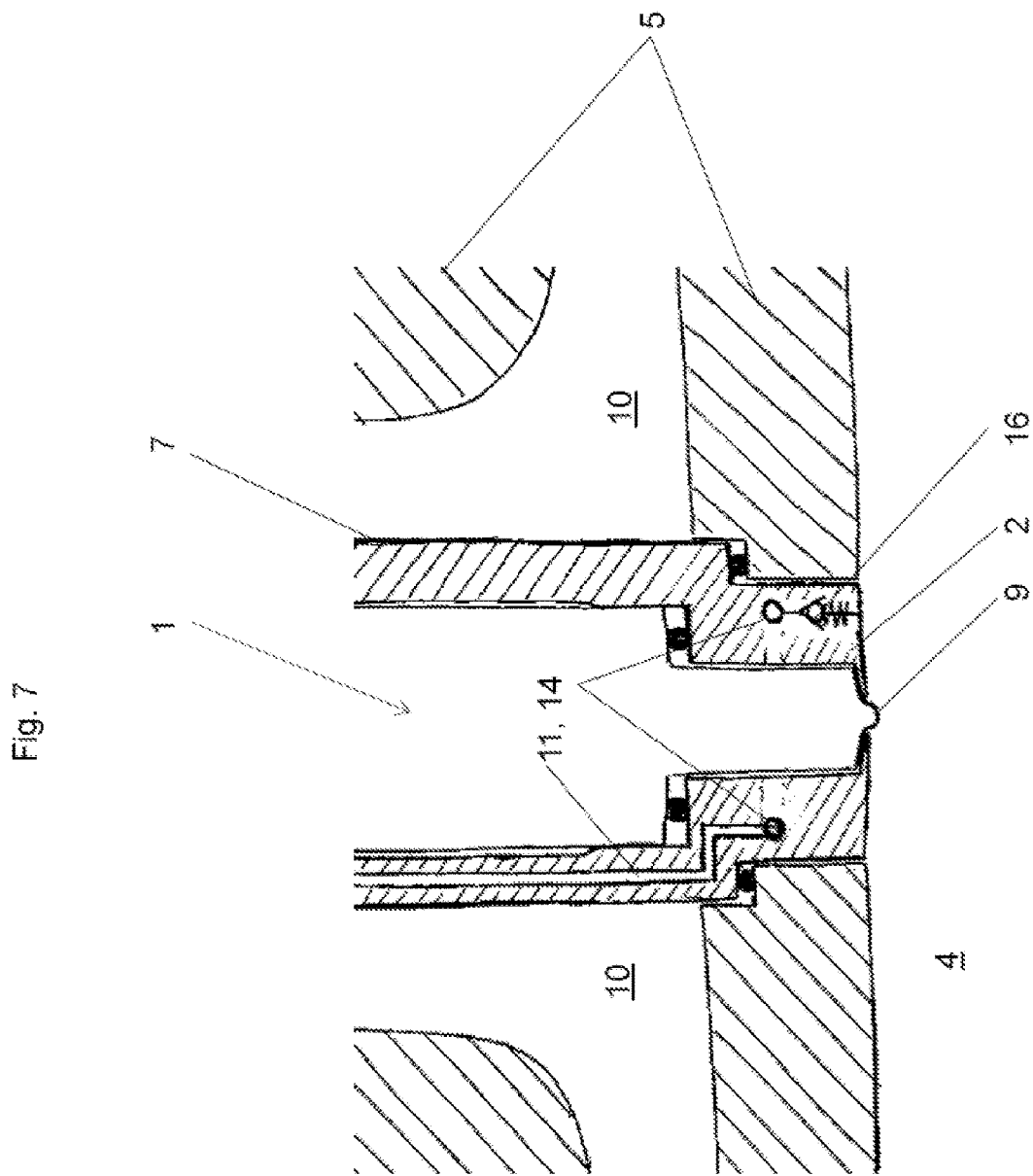

ASSEMBLY CONSISTING OF A CYLINDER HEAD AND A FUEL INJECTOR

BACKGROUND OF THE INVENTION

Embodiments of the invention relate to an assembly consisting of a cylinder head and a fuel injector for an internal combustion engine.

Fuel injectors are used in internal combustion engines to supply fuel to the combustion chambers of the internal combustion engine. For this purpose, various construction methods are known for the implementation of the fuel metering. Fuel injectors are used both in gasoline engines, i.e. externally ignited internal combustion engines, and in internal combustion engines with self-ignition, i.e. in diesel engines or dual-fuel engines. The fuel injectors are often arranged in a bore of the cylinder head. It is also possible to provide the fuel injectors in injector sleeves, which in turn are inserted into the cylinder head of the internal combustion engine.

The nozzle opening of a fuel injector is exposed to the high temperatures present in the combustion chamber of the internal combustion engine. The high temperatures at the nozzle opening of the fuel injector on the one hand stress the material of the fuel injector and can lead to its deformation; on the other hand, coking of the fuel can occur, which in turn impairs the function of the fuel injector.

Therefore, there are proposals to cool the fuel injector and, in particular, the tip of the fuel injector facing the combustion chamber.

DE 102 34 324 A1 discloses, for example, a fuel injector in which an outer circumferential surface of the nozzle shaft tapers and the actual nozzle can be designed around it so as to prevent the entry of combustion gases between the nozzle body and the injector sleeve to thereby provide a heat transfer of combustion gases to the nozzle opening (injector tip). A cooling effect of the nozzle opening is thus achieved according to this text by a conical shell element enclosing the nozzle body and sealing it such that no hot combustion gases can penetrate between the nozzle sleeve and the nozzle opening. To improve the heat dissipation, the nozzle shell can be cooled.

The generic DE 3 529 769 A1 shows a heat protection plate for the assembly between the cylinder head of an internal combustion engine and the nozzle holder of an injection nozzle, consisting of an outer annular section axially clamped between the cylinder head and the nozzle holder, and an inner annular flange connected to the annular section, which, with its free inner end, abuts the region of the injection nozzle openings on the nozzle holder in a sealing manner. The heat protection plate (heat shield) serves on the one hand to protect the injection nozzle from heat and, on the other hand, as a seal between the injection nozzle holder and the cylinder head.

A disadvantage of the solutions known from the prior art is that the fuel injector is largely unprotected, in particular in the area of its tip, against a combustion chamber of the internal combustion engine, resulting in a large heat input into the fuel injector.

BRIEF DESCRIPTION OF THE INVENTION

Embodiments of the invention provide an assembly with reduced heat input into the fuel injector.

This object is achieved by an assembly consisting of a cylinder head and a fuel injector.

By providing a heat dissipation device in the region of the heat shield that transports heat from a combustion chamber of the internal combustion engine, the heat input to the fuel injector is effectively reduced. In addition, in particular in the case of dual-fuel applications, the heat shield itself is prevented from becoming the source of glow ignitions.

It may be provided that the heat dissipation device comprises a heat sink. Here, it is thus provided that heat is dissipated from the combustion chamber by means of a heat sink into the cylinder head, which (heat) would enter the fuel injector without this measure. In the context of embodiments of the invention, a heat sink means a passive heat dissipation device, i.e. the heat dissipation is performed by means of heat conduction. For this purpose, the components involved, such as the heat shield, are, in an embodiment, manufactured from materials with high thermal conductivity.

It can, in an embodiment, be provided that the heat dissipation device comprises a cooling device which can be flowed through or circulated by a cooling medium. According to this embodiment, there is thus active cooling via a cooling medium.

It is, in an embodiment, provided that the cooling device comprises cooling channels. By means of cooling channels, the cooling medium can be directed specifically to the locations of the heat input.

It may be provided that the cooling device can be connected to at least one combustion chamber via at least one opening. This describes the case in which the cooling device is in a fluid connection with the combustion chamber. Thus, the cooling device, in an embodiment, via correspondingly designed cooling channels, has at least one opening to the combustion chamber, through which the cooling medium can be introduced into the combustion chamber. By way of a non-limiting example, compressed air can be introduced into the combustion chamber. To ensure a controlled function, a metering device, e.g. a valve or a diaphragm device, may be provided for introducing the cooling medium into the combustion chamber.

It may be provided that the cooling device can be connected to a fuel source. This makes it possible, in the presence of at least one opening of the cooling device to the combustion chamber, to supply fuel to the combustion chamber via the cooling device.

It may be provided that the cooling medium is a propellant gas or charge air.

According to this embodiment, propellant gas or charge air is used to flow through or circulate around the cooling device to dissipate heat from the heat shield. This can be achieved, for example, by passing part of the propellant gas or charge air of the internal combustion engine via cooling channels through the cooling device.

With the use of propellant gas as a cooling medium, there is the possibility, in addition to cooling, of introducing fuel into the combustion chamber via this route. In this case, a connection of the cooling channels with the combustion chamber is provided.

Thus, the cooling device can also be used as an additional fuel supply device.

It may be provided that the cooling device can be designed as liquid cooling. The liquid cooling can thus be designed, for example, in the form of cooling channels, which are separate from the cooling system of the cylinder head or connected to the cooling system of the cylinder head. The cooling medium can be a medium that is separate from the cooling system of the cylinder head or it can be the same medium. The cooling medium used for the liquid cooling is typically water, a water-glycol mixture or oil. In one variant, a flow connection of the cooling device can be provided such that the cooling medium can be introduced into the combustion chamber.

If, for example, water is used, the NOx emissions can also be reduced by introducing water into the combustion chamber in addition to cooling the heat shield, because the temperatures in the combustion chamber can be reduced by removing the evaporation heat of the water.

It may be provided that the cooling device can be designed as a heat pipe. If the cooling device is designed as a heat pipe, the heat dissipation can also be effective without a fluid connection to the cooling circuit of the cylinder head. The functional principle of a heat pipe itself is known from the prior art.

For the application to the heat dissipation device of embodiments of the invention, for example, a cooling channel can be designed in such a way that a cooling medium evaporates at the end facing the heat shield and thus absorbs heat from the heat shield. At the other end of the cooling channel, which acts as a heat pipe, the cooling medium condenses again and thereby emits heat, for example to the cylinder head.

The heat shield is, in an embodiment, designed in such a way that the spray angle of the fuel injector is not restricted.

A particular advantage of embodiments of the invention is that, by heat dissipation from the heat shield, it is ensured that no local overheating occurs at the heat shield, which can lead to misfires. The heat shield with a heat dissipation device can be regarded, as it were, as a cooled heat shield.

Embodiments of the invention are particularly suited for use in dual-fuel internal combustion engines. In the case of dual-fuel internal combustion engines, only very small quantities of fuel are injected via the fuel injector in the pilot injection operating state. In this case, therefore, the fuel injector is only slightly cooled by the fuel.

The measures included in embodiments of the invention for reducing the heat input to the fuel injector can be classified as follows. The measures can be combined in any desired manner.

Heat dissipation by means of: heat conduction (material with good thermal conductivity); (forced) convection; heat pipes.

Heat dissipation (examples for heat sinks): to colder regions of the cylinder head, to the cooling circuit of the cylinder head, oil circuit of the cylinder head, to a separate cooling circuit or to an operating medium that subsequently enters the combustion chamber: fuel gas water for water injection compressed air as part of the combustion air.

Integration of the heat shield into: cylinder head (if necessary by means of an insert) or injector sleeve.

Design of the fits between the fuel injector and the injector sleeve or cylinder head and, if present, between the injector sleeve and the cylinder head: optional gap to prevent heat transfer between the components; the end of the gap facing the combustion chamber can be sealed by specific design measures to reduce the cyclical entry of hot fuel gas and the resulting heat input into the fuel injector.

BRIEF DESCRIPTION OF THE DRAWINGS

Embodiments of the invention are explained in more detail with reference to the figures.

FIGS. 2A and 2B illustrate assemblies according to an exemplary embodiment in two variants, FIG. 3 illustrates an assembly according to an exemplary embodiment, FIG. 5 illustrates an assembly according to an exemplary embodiment, FIG. 6 illustrates an assembly according to an exemplary embodiment, FIG. 7 illustrates an assembly according to an exemplary embodiment.

DETAILED DESCRIPTION

FIGS. 1 to 4 show variants of a heat shield without an active cooling device, i.e. here the heat dissipation takes place by heat conduction into the cylinder head. Variations relate inter alia to the formation of an air gap between the injector sleeve and the fuel injector.

In the variants according to FIGS. 5 and 6, active cooling is shown.

In the variant according to FIG. 7, a connection of the cooling device to the combustion chamber is shown.

Figure 1:
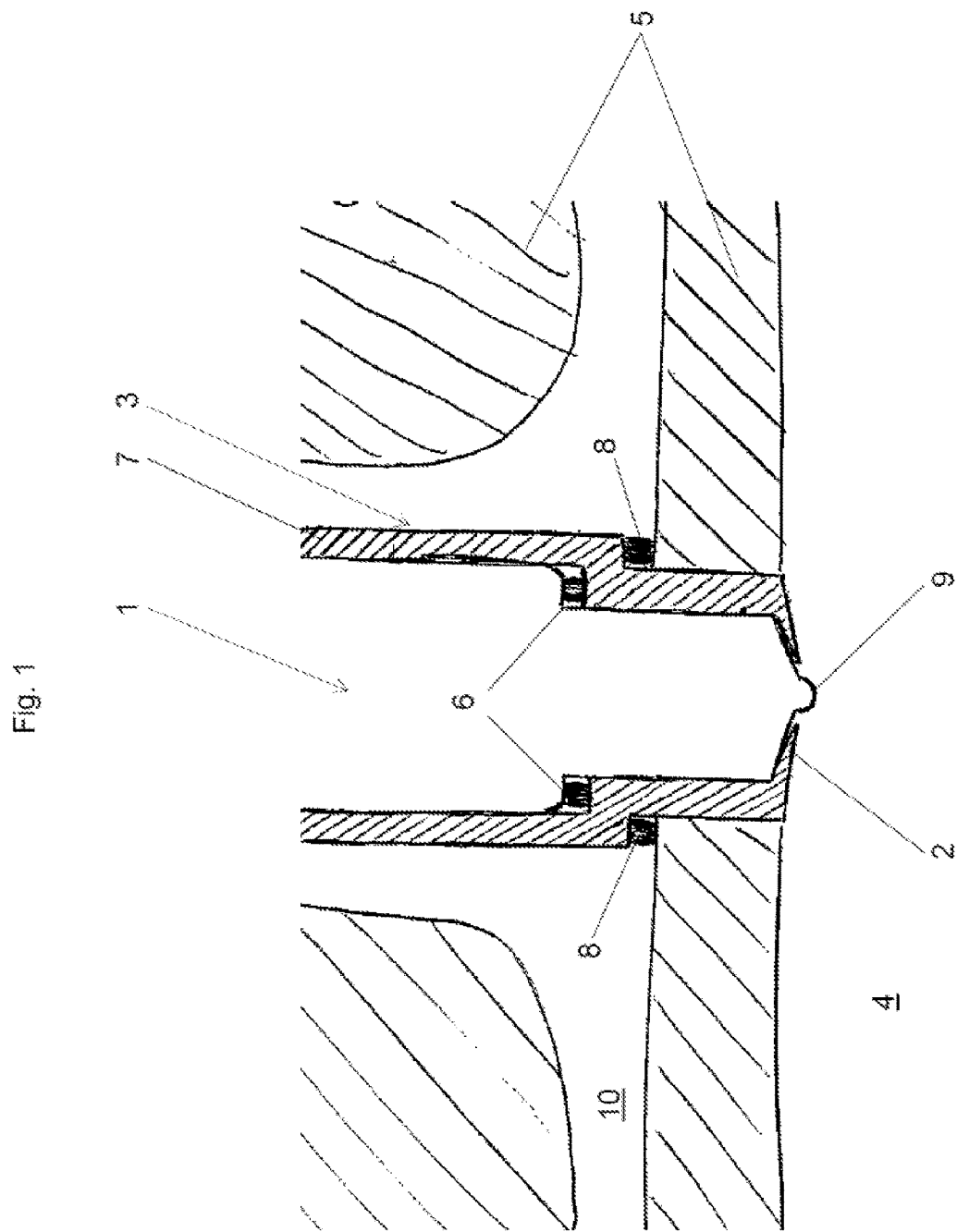
FIG. 1 illustrates an assembly of a cylinder head and a fuel injector according to an exemplary embodiment.

FIG. 1 shows an assembly of a cylinder head 5 and a fuel injector 1 in a first exemplary embodiment in a schematic representation of the cross-section. The fuel injector 1 is here indicated by its contours only. For reasons of clarity, a representation of the injector components located in the fuel injector 1, such as a nozzle needle, has been omitted. In this exemplary embodiment, the fuel injector 1 is arranged in an injector sleeve 7. The injector sleeve 7 is mounted in the cylinder head 5 and sealed with the sealing means 8 against the cylinder head 5. In turn, the fuel injector 1 is sealed with the sealing means 6 against the injector sleeve 7. The heat shield 2 according to embodiments of the invention is designed as a tapering collar facing the injector tip 9. Shown here in a sectional view, the heat shield 2 surrounds the injector tip 9 according to embodiments of the invention along the entire circumference. In the plan view, the heat shield 9 would thus form a circular ring. The heat shield 2 surrounds the injector tip 9 in such a way that only the injector tip 9 is exposed to the combustion chamber 4. In this case, the injector sleeve 7, which, for example, can be manufactured from a material with good thermal conductivity, acts as the heat dissipation device 3. In this exemplary embodiment, the injector sleeve 7 is surrounded by the cooling circuit of the cylinder head 5. Thus, the heat dissipation from the heat shield 2 is increased by the heat dissipation device 3 designed in the form of the injector sleeve 7.

In an embodiment, the heat dissipation from the heat shield 2 that, as in this exemplary embodiment, the heat shield 2 and injector sleeve 7 according to embodiments of the invention form an integral component. However, according to embodiments of the invention, the heat shield can also be an integrated component of the cylinder head, as shown in the further figures.

FIGS. 2A and 2B show an assembly according to a further exemplary embodiment in two variants.

In this exemplary embodiment, the fuel injector 1 is arranged in an injector sleeve 7. The injector sleeve 7 is mounted in the cylinder head 5 and sealed with the sealing means 8 against the cylinder head 5. In turn, the fuel injector 1 is sealed with the sealing means 6 against the injector sleeve 7.

In this exemplary embodiment, an air gap 12 is provided between the fuel injector 1 and the injector sleeve 7. This air gap extends from the sealing means 6 as far as the injector tip 9 in relation to the longitudinal axis of the fuel injector 1. The air gap 12 acts as insulation and minimizes the heat input from the injector sleeve 7 into the fuel injector 1. The heat dissipation device 3 is therefore also designed here in the form of the injector sleeve 7. The heat dissipation from the heat shield 2 takes place here by heat conduction in the injector sleeve 7, the heat being delivered to the cooling circuit 10 of the cylinder head 5 analogously to the variant according to FIG. 1.

In the variant according to FIG. 2A, the air gap 12 is opened against the combustion chamber 4.

In the variant according to FIG. 2B, the fuel injector 1 rests on the heat shield 2 in the region of the injector tip 9. As a result, the air gap 12 is closed off from the combustion chamber 4. This has the effect that, on the one hand, no hot gases can penetrate from the combustion chamber 4 into the air gap 12. In addition, the thermal contacting between the heat shield 2 and the fuel injector 1 has a favorable effect on the temperature distribution of the components involved.

FIG. 3 shows an assembly according to a further exemplary embodiment.

The heat shield 2 is again designed as part of the injector sleeve 7.

The injector sleeve 7 serves as the heat dissipation device 3, as in the exemplary embodiments according to FIGS. 1, 2A and 2B. For this purpose, it is composed of a material with good thermal conductivity. Examples of such materials are copper alloys. An air gap 12 can again be provided.

In the embodiment shown here, one structural detail of the fuel injector 1 and heat shield 2 must be emphasized:

Fuel injectors have a conical section in front of the injector tip, in which the fuel injector tapers towards the injector tip. This conical section has an opening angle α.

The inclination of the heat shield 2 is selected in such a way that it follows the contour of the fuel injector 1 in the region of the injector tip 9.

In the exemplary embodiment shown, the opening angle α of the conical section is selected to be particularly pointed, i.e. the size of the opening angle α is smaller than usual.

This results in a greater wall thickness of the heat shield 2. This increased cross-section is advantageous for heat dissipation and is more resistant to wear.

Opening angles α of fewer than 130° have proven to be particularly advantageous.

This structural feature is also applicable to other exemplary embodiments of the invention.

Figure 4:
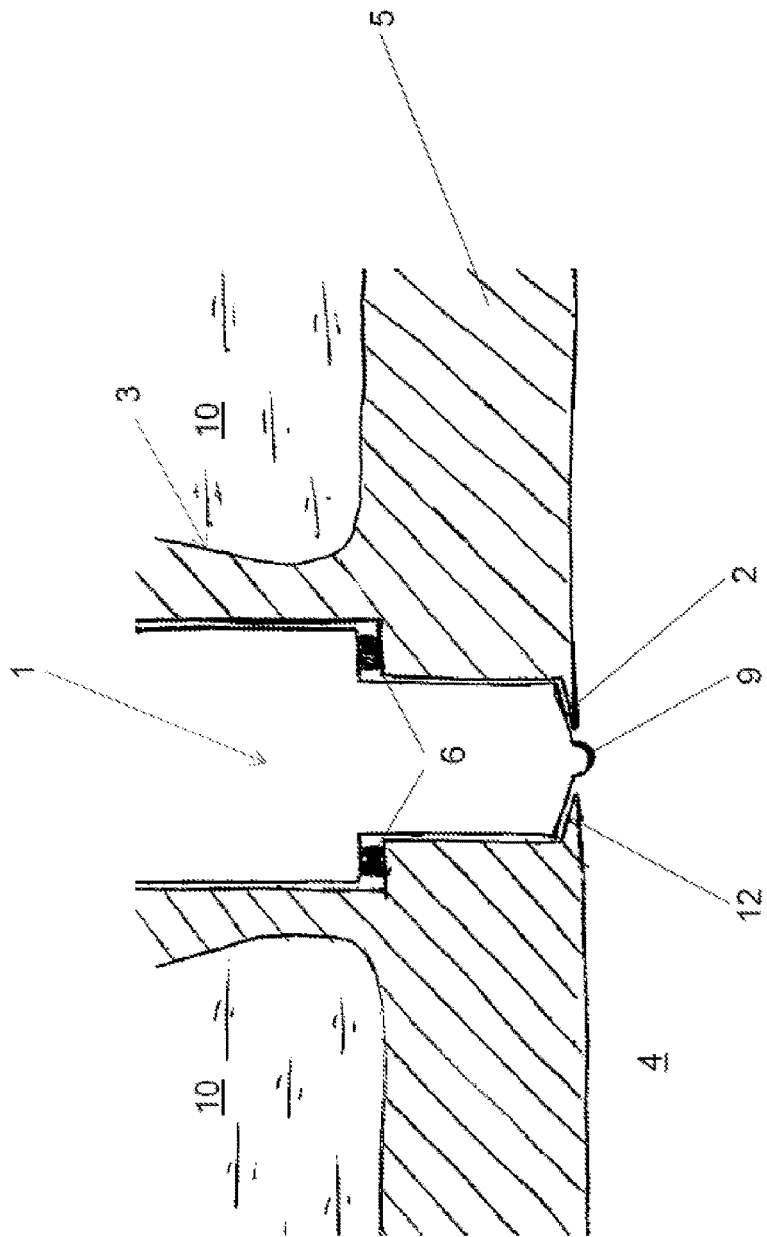
FIG. 4 illustrates an assembly according to an exemplary embodiment.

FIG. 4 shows a further exemplary embodiment. Here, the fuel injector 1 is arranged directly in the cylinder head 5 without an injector sleeve and is sealed by the sealing means 6. The heat shield 2, in this case as in the preceding exemplary embodiments, is a collar that surrounds the nozzle tip, whereby the collar in this case is formed from the cylinder head 5 itself. The cylinder head 5 therefore functions here as the heat dissipation device 3. In this exemplary embodiment, the fuel injector 1 is separated from the cylinder head 5, i.e. there is an air gap 12 between the fuel injector 1 and the cylinder head 5. In one variant, the exemplary embodiment can also be implemented without an air gap 12.

FIG. 5 shows a further exemplary embodiment. The heat shield 2 is also designed here as a collar of the injector sleeve 7 that surrounds the injector tip 9.

In this exemplary embodiment, the heat dissipation device 3 is designed as a cooling device 11 with cooling channels 14, which communicate with the cooling circuit 10 of the cylinder head 5. A cooling medium 13 can flow through the cooling channels 14. In the region of the heat shield 2, the cooling channel 14, in an embodiment, runs as a circumferential annular channel to ensure the uniform cooling of the heat shield 2.

The flow of a cooling medium 13 is symbolized by black arrows. The flow direction can, of course, also be reversed as shown. The injector sleeve 7 is sealed off from the cylinder head 5 by the sealing means 8. The fuel injector 1 is sealed off from the injector sleeve 7 by the sealing means 6. In this exemplary embodiment, the fuel injector 1 is separated from the injector sleeve 7, i.e. there is an air gap 12 between the fuel injector 1 and the injector sleeve 7.

For the exemplary embodiments with an air gap 12 between the fuel injector 1 and the injector sleeve 7, or between the fuel injector 1 and the cylinder head 5, a medium can be directed through the air gap 12 in the direction of the combustion chamber 4 to support the cooling effect. As the medium, fluids or gases are suitable.

If, for example, water is used, the NOx emissions can also be reduced by introducing water in addition to cooling the heat shield 2, because the temperatures in the combustion chamber 4 can be reduced by removing the evaporation heat of the water.

When propellant gas is used as the medium, there is the additional benefit that fuel is introduced into the combustion chamber 4 via this route.

The use of compressed air as the medium is also conceivable.

In an embodiment, the medium is introduced via the air gap 12 during the charge changing, in such a way that as little work as possible needs to be done against the pressure prevailing in the combustion chamber 4.

FIG. 6 shows an exemplary embodiment according to which the cooling device 11 is designed as a heat pipe 15. A heat pipe is described as a cooling system in which a cooling medium circulates with a phase transition that is adapted to the anticipated operating temperatures. At the hot end (in this case, the section facing the heat shield 2), the cooling medium evaporates. At the cool end (in this case, the section facing the cooling circuit 10 of the cylinder head), the heat is released again with condensation of the cooling medium.

FIG. 7 shows an exemplary embodiment in which the cooling channels 14 of the cooling device 11 can be connected to the combustion chamber 4 via a valve 16. This provides the possibility of introducing the cooling medium 13 into the combustion chamber 4.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly for an internal combustion engine with at least one combustion chamber, the assembly comprising:
   a cylinder head;
   a fuel injector comprising an end with an injector tip;
   a heat shield formed as a tapering collar extending toward the injector tip with a first elongated surface to at least partially surround a tapered surface of the fuel injector at the end with the injector tip, an air gap formed between at least a portion of the first elongated surface of the heat shield that overlaps with the tapered surface of the fuel injector at the end with the injector tip, and opposite the first elongated surface, an elongated second surface of the heat shield facing and exposed within the at least one combustion chamber; and a heat dissipation device, arranged in a region of the heat shield, through which heat from the at least one combustion chamber is dissipated;

wherein the heat shield is unitarily formed with an injector sleeve or the cylinder head.

2. The assembly according to claim 1, wherein the heat dissipation device comprises a heat sink.

3. The assembly according to claim 1, wherein the heat dissipation device comprises a cooling device through which a cooling medium flows or circulates.

4. The assembly according to claim 3, wherein the cooling device comprises cooling channels.

5. The assembly according to claim 3, wherein the cooling device connects to the at least one combustion chamber via at least one opening.

6. The assembly according to claim 3, wherein the cooling device connects to a fuel source.

7. The assembly according to claim 3, wherein the cooling medium is a propellant gas, air, or charge air.

8. The assembly according to claim 3, wherein the cooling medium is water.

9. The assembly according to claim 3, wherein the cooling device is a heat pipe.

10. The assembly according to claim 1, wherein the air gap is closed off from the at least one combustion chamber.

11. The assembly according to claim 1, wherein the first elongated surface is in abutting contact with the tapered surface of the fuel injector.

* * * * *